United States Patent
Brown et al.

(10) Patent No.: US 10,657,621 B2
(45) Date of Patent: May 19, 2020

(54) MOVING STRUCTURE MOTION COMPENSATION IN IMAGING

(71) Applicant: KONINKLIJKE PHILIPS N.V., Eindhoven (NL)

(72) Inventors: Kevin Martin Brown, Chardon, OH (US); Michael Grass, Buchholz In der Nordheide (DE); Manindranath Vembar, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 195 days.

(21) Appl. No.: 15/104,546

(22) PCT Filed: Dec. 9, 2014

(86) PCT No.: PCT/IB2014/066723
§ 371 (c)(1),
(2) Date: Jun. 15, 2016

(87) PCT Pub. No.: WO2015/092612
PCT Pub. Date: Jun. 25, 2015

(65) Prior Publication Data
US 2016/0321821 A1    Nov. 3, 2016

Related U.S. Application Data

(60) Provisional application No. 61/918,869, filed on Dec. 20, 2013.

(51) Int. Cl.
*G06K 9/00* (2006.01)
*G06T 3/00* (2006.01)
(Continued)

(52) U.S. Cl.
CPC .............. *G06T 3/0006* (2013.01); *G06T 3/20* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 7,630,528 B2    12/2009    Koehler
2008/0205722 A1    8/2008    Schaefer
(Continued)

FOREIGN PATENT DOCUMENTS

WO    2013121312    8/2013

OTHER PUBLICATIONS

Isola, et al., "Cardiac motion-corrected iterative cone-beam CT reconstruction using a semi-automatic minimum cost path-based coronary centerline extraction", 0mputerized Medical Imaging and Graphics, Pergamon Press, New York, NY, US, vol. 36, No. 3, Dec. 19, 2011.

(Continued)

*Primary Examiner* — Hadi Akhavannik
(74) *Attorney, Agent, or Firm* — Larry Liberchuk

(57) ABSTRACT

A method includes manipulating segmented structure of interest, which is segmented from first reconstructed image data at a reference motion phase of interest, that is registered to second reconstructed image data at one or more other motion phases. The method further includes updating initial motion vector fields corresponding to the registration of the segmented structure of interest to the second reconstructed image data based on the manipulation. The method further (Continued)

includes reconstructing the projection data with a motion compensated reconstruction algorithm employing the updated motion vector fields.

20 Claims, 7 Drawing Sheets

(51) Int. Cl.
    *G06T 11/00*     (2006.01)
    *G06T 7/11*     (2017.01)
    *G06T 7/215*     (2017.01)
    *G06T 3/20*     (2006.01)
    *G06T 7/00*     (2017.01)

(52) U.S. Cl.
    CPC .......... *G06T 7/215* (2017.01); *G06T 11/003* (2013.01); *G06T 11/005* (2013.01); *G06T 2207/30064* (2013.01); *G06T 2207/30101* (2013.01); *G06T 2211/412* (2013.01)

(56) References Cited

U.S. PATENT DOCUMENTS

| | | |
|---|---|---|
| 2008/0267455 A1 | 10/2008 | Grass |
| 2009/0141968 A1 | 6/2009 | Sun |
| 2009/0310825 A1 | 12/2009 | Bontus |
| 2010/0272315 A1 | 10/2010 | Tsin |
| 2011/0142313 A1 | 6/2011 | Pack |
| 2011/0170658 A1* | 7/2011 | Arakita ............... A61B 6/032 378/8 |
| 2011/0293143 A1* | 12/2011 | Narayanan ........... G06T 7/0028 382/103 |
| 2012/0237097 A1* | 9/2012 | Koehler ............... G06T 11/008 382/128 |
| 2013/0101187 A1 | 4/2013 | Sundar |
| 2013/0216110 A1 | 8/2013 | Zheng |
| 2014/0049607 A1* | 2/2014 | Amon ................. H04N 19/105 348/43 |

OTHER PUBLICATIONS

Yu, et al., "A 3D Freehand Ultrasound System for Multi-view Reconstructions from Sparse 2D Scanning Planes", BioMedical Engineering OnLine 2011.

Isola et al., "Motion compensated iterative reconstruction of a region of interest in cardiac cone-beam CT", COmputerized Medical Imaging and Graphics, Pergamon Press, New York, NY, US, vol. 34, No. 2, Mar. 2010.

Isola, et al., "Coronary segmentation based motion corrected cardiac CT reconstruction", Nuclear Science Symposium Conference Record (NSS/MIC), 2010 IEEE, IEEE, Oct. 30, 2010.

* cited by examiner

MOVING STRUCTURE MOTION COMPENSATION IN IMAGING

CROSS REFERENCE TO RELATED APPLICATIONS

This application is the U.S. National Phase application under 35 U.S.C. § 371 of International Application No. PCT/IB2014/066723, filed Dec. 9, 2014, published as WO 2015/092612 on Jun. 25, 2015, which claims the benefit of U.S. Provisional Patent Application No. 61/918,869 filed Dec. 20, 2013. These applications are hereby incorporated by reference herein.

The following generally relates to imaging and more particularly to a motion compensated reconstruction of a moving structure, and is described with particular application to computed tomography (CT). However, the following is also amenable to other imaging modalities such as positron emission tomography (PET), single photon emission tomography (SPECT), magnetic resonance (MR), and/or other modalities.

A computed tomography (CT) scanner generally includes an x-ray tube mounted on a rotatable gantry opposite a detector array across an examination region. The rotatable gantry and hence the x-ray tube rotate around the examination region and a subject therein. The x-ray tube emits radiation that traverses the examination region and the subject. The detector array detects radiation that traverses the examination region and generates projection data indicative thereof.

The projection data is reconstructed, generating volumetric image data indicative of the scanned subject. The volumetric image data can be processed to generate one or more images indicative of the scanned subject. However, organ motion (e.g., cardiac, respiratory, etc.) during scanning may introduce artifact (e.g., blurring, etc.) into the projection data and hence the reconstructed volumetric image data and/or the generated images. Motion compensated reconstruction can be used to reduce motion artifact.

With one approach, in connection with a cardiac scan, projection data is reconstructed for a particular cardiac motion phase of interest (e.g. a relatively "quiet" or "resting" phase). A coronary vessel(s) is identified in the reconstructed image data and segmented. Projection data is also reconstructed for one or more other cardiac motion phases. The segmented volume is registered with the other reconstructed volumetric image data, producing deformation or motion vector fields (MVFs) there between.

The projection data is then reconstructed with a motion compensated reconstruction that utilizes the MVFs. The resulting volumetric image data should have improved image quality relative to reconstructing without taking into account cardiac motion. However, there are instances in which the registration may fail. Unfortunately, with these instances, the image quality of the motion compensated reconstructed volumetric image may be reduced compared to a non-motion compensated reconstruction.

Aspects described herein address the above-referenced problems and others.

The following describes an approach for compensating for motion of scanned moving structure. This includes determining first motion vector fields based on a reference motion phase of interest through known and/or other approaches. The first motion vector fields are then refined to more accurately reflect the actual motion of the scanned moving structure. In one instance, this is achieved by adapting segmented tissue of interest from a reference motion phase that is registered with and superimposed over image data corresponding to another motion phase align with the corresponding structure in the image data corresponding to the other motion phase. A validation check can be used to make sure the adaption will not result in motion vector fields that will corrupt the reconstruction. The projection data is then reconstructed with a motion compensated reconstruction algorithm that utilizes the refined motion vector fields.

In one aspect, a method includes manipulating segmented structure of interest, which is segmented from first reconstructed image data at a reference motion phase of interest, that is registered to second reconstructed image data at one or more other motion phases. The method further includes updating initial motion vector fields corresponding to the registration of the segmented structure of interest to the second reconstructed image data based on the manipulation. The method further includes reconstructing the projection data with a motion compensated reconstruction algorithm employing the updated motion vector fields.

In another aspect, a scan data processor includes a motion phase of interest reconstructor that reconstructs a sub-set of projection data corresponding to a motion phase of interest, generating first image data. The scan data processor further includes a tissue of interest identifier that identifies tissue of interest in the first image data. The scan data processor further includes a volume of interest segmentor that segments the identified tissue of interest in the first image data. The scan data processor further includes a registerer/motion vector field estimator that registers the segmented tissue of interest with second image data reconstructed at one or more other motion phases, thereby generating motion vector fields between the segmented tissue of interest and the second image data reconstructed at the one or more other motion phases. The scan data processor further includes a motion vector field motion vector field updater that manipulates that manipulates the registered segmented tissue of interest in connection with the second image data and updates the motion vector fields based on the manipulation. The scan data processor further includes a motion compensated reconstructor that reconstructs the projection data with a motion compensated reconstruction algorithm that uses the updated motion vector fields.

In another aspect, a computer readable storage medium is encoded with computer readable instructions. The computer readable instructions, when executed by a processer, causes the processor to: adapt a segmented vessel centerline registered to a coronary artery in image data to more accurately align with the coronary artery, and refine a motion vector field corresponding to the registration between the segmented vessel centerline to the image data based on the adaption.

The invention may take form in various components and arrangements of components, and in various steps and arrangements of steps. The drawings are only for purposes of illustrating the preferred embodiments and are not to be construed as limiting the invention.

FIG. 1 schematically illustrates an example computing system with a scan data processor in connection with an imaging system.

FIG. 2 schematically illustrates an example of the scan data processor.

FIG. 3 schematically illustrates a variation of the scan data processor of FIG. 2.

Figure 1:
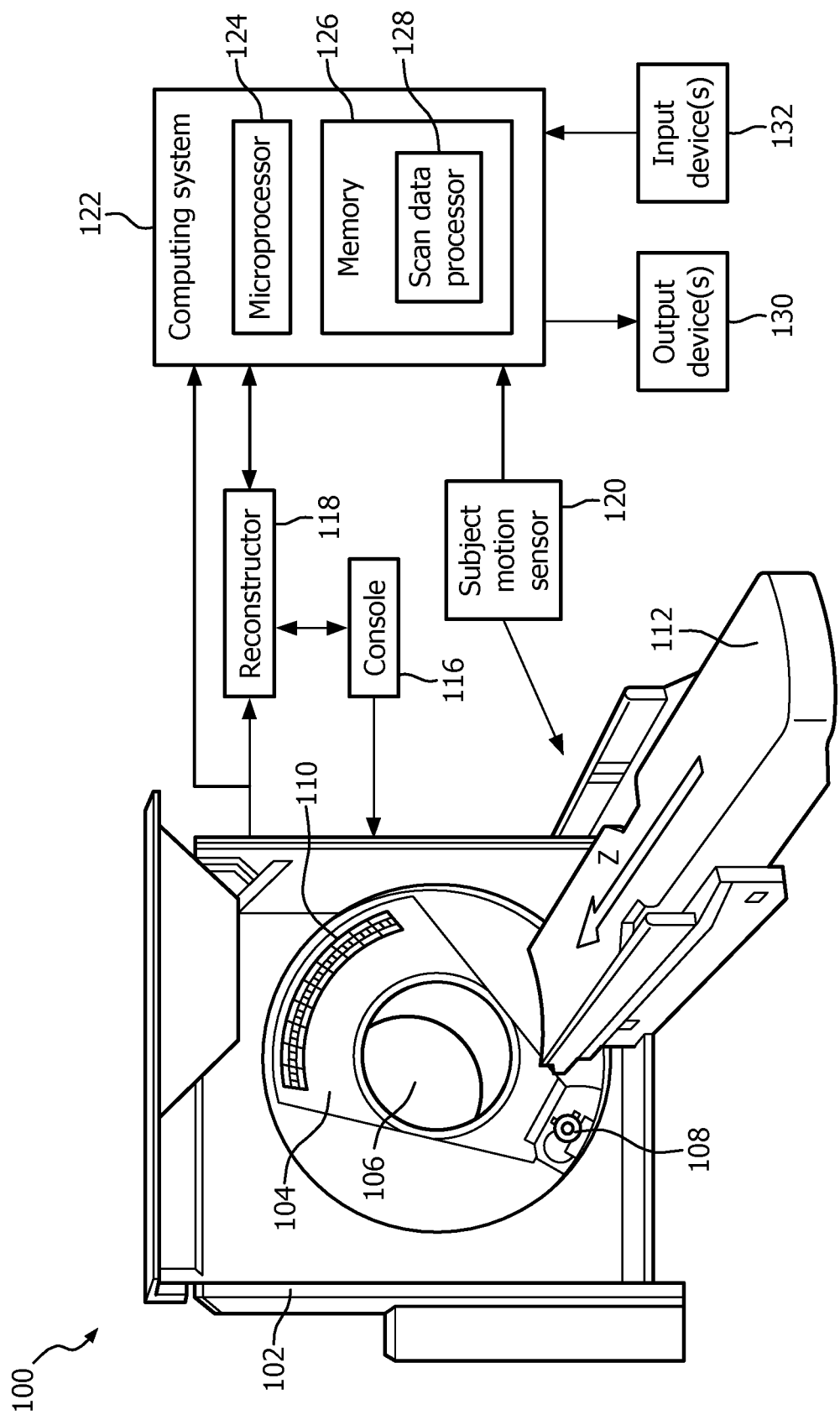

The following describes an approach to compensate for motion of scanned moving structure. Initially referring to FIGURE, an example imaging system 100, such as a computed tomography (CT) scanner, is schematically illustrated. The imaging system 100 includes a generally stationary gantry 102 and a rotating gantry 104. The rotating gantry 104 is rotatably supported by the stationary gantry 102 and rotates around an examination region 106 about a longitudinal or z-axis.

A radiation source 108, such as an x-ray tube, is rotatably supported by the rotating gantry 104. The radiation source 108 rotates with the rotating gantry 104 and emits radiation that traverses the examination region 106. A one or two-dimensional radiation sensitive detector array 110 subtends an angular arc opposite the radiation source 108 across the examination region 106. The detector array 110 includes a plurality of rows of detectors that extend along the z-axis direction. The detector array 110 detects radiation traversing the examination region 106 and generates projection data indicative thereof.

A subject support 112, such as a couch, supports an object or subject in the examination region 106. A computing system serves as an operator console 114 and includes a human readable output device such as a monitor and an input device such as a keyboard, mouse, etc. The console 114 allows an operator to interact with the scanner 100 via a graphical user interface (GUI) and/or otherwise. For instance, the user can interact with the operator console 114 to select a cardiac, respiratory, etc. protocol. A reconstructor 118 reconstructs the projection data and generates volumetric data indicative thereof.

A subject motion sensor 120 senses motion of a subject disposed in the examination region 106 and generates a motion signal indicative thereof. Such motion can be related to the heart, lung, or other moving structure. The motion signal is synchronized with scanning and provides information that reflects a state of the moving structure such as a motion phase from a plurality of different motion phases of the moving structure. Examples of suitable motion sensors for anatomical moving structures include, but are not limited to, an electrocardiogram (ECG), a breathing (respiratory) belt, etc.

A computing system 122 includes at least one microprocessor 124 and a computer readable storage medium ("memory") 126. The memory 126 excludes transitory medium and includes physical memory and/or other non-transitory storage medium. The microprocessor 124 executes at least a scan data processor 128 instruction(s) stored in the memory 126. The microprocessor 124 may also executes a computer readable instruction carried by a carrier wave, a signal or other transitory medium. The computing system 122 can be part of the console 116 and/or separate therefrom (as illustrated in FIG. 1).

The scan data processor 128 instruction(s) at least includes an instruction(s) for processing at least projection and/or image data of scanned moving structure. As described in greater detail below, this includes generating an initial set of motion vector fields between a reconstruction at a reference motion phase of interest and one or more reconstructions at other motion phases, refining the set of motion vector fields to more accurately reflect the true motion of the scanned moving structure, and employing the refined set of motion vector fields to reconstruct the same volume using a motion compensated reconstruction algorithm.

This approach can facilitate identifying instances in which a set of motion vector fields does not accurately reflect the true motion of the scanned moving structure and allows for adjusting the set of motion vector fields to more accurately reflect the true motion of the scanned structure. This may mitigate degradation of image quality due to, for example, reconstructing the corresponding projection data with a motion compensated reconstruction algorithm using inaccurate motion vector fields, while improving image quality relative to reconstructing the corresponding projection data without taking into consideration (i.e., compensating) the motion of the scanned structure.

The computing system 122 further includes an output device(s) 130 such as a display monitor, a filmer, etc., and an input device(s) 132 such as a mouse, keyboard, etc. The output device(s) 130 can be used to visually display image data such as image data reconstructed at a motion phase of interest and/or at one or more other motion phases. The input device(s) 132, as described in greater detail below, can be used to one of more of select a motion phase of interest, select neighboring motion phases, identify tissue of interest, segment the tissue interest at the motion phase of interest, register the segmented tissue interest with image data at the neighboring motion phases, physically manipulate (e.g., translate, rotate, scale, etc.) registered segmented tissue interest, etc.

Figure 2:
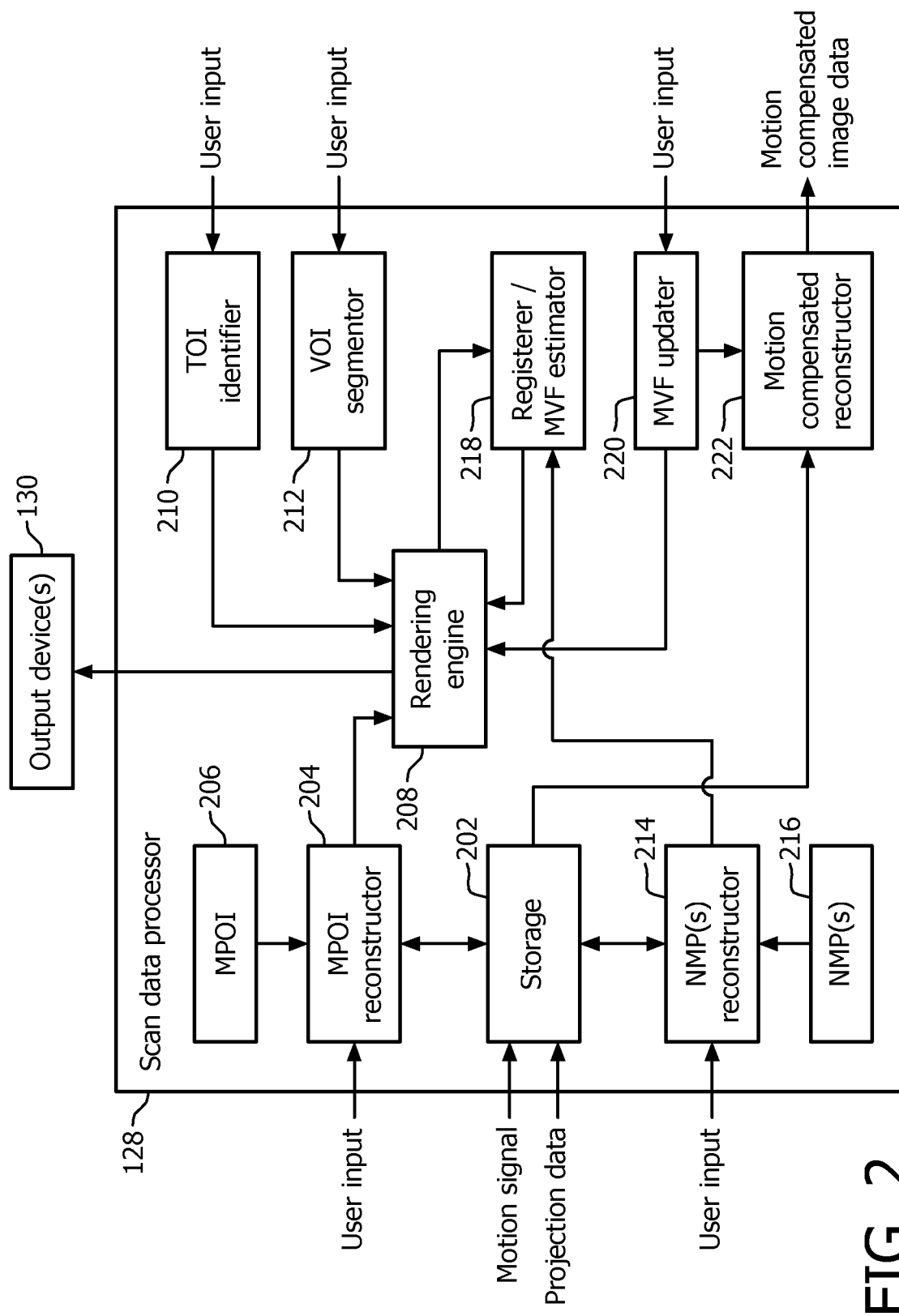

FIG. 2 schematically illustrates an example of the scan data processor 128.

The scan data processor 128 is allocated storage 202, which stores projection data and the motion signal. The projection data can be from and/or generated by the imaging system 100 and/or other imaging system. In one instance, the motion signal can be from and/or generated by the subject motion sensor 120 and/or other subject motion sensor. In another instance, the motion signal is from a mean motion model of the heart and is not specific to the subject. Alternatively, the projection data and/or motion signal can be from a data repository such as a picture archiving and communication system (PACS), a radiology information system (RIS), a hospital information system (HIS), etc. In a variation, the storage 202 is omitted and the projection data and/or the motion signal are provided to other components of the scan data processor 128.

The scan data processor 128 includes a motion phase of interest (MPOI) reconstructor 204. The MPOI reconstructor 204 reconstructs projection data corresponding to a particular reference motion phase of interest. In this example, scan data processor 128 includes as a motion phase of interest (MPOI) 206, which identifies the particular phase of interest utilized by the MPOI reconstructor 204. The MPOI 206 can be a default, user preference, protocol based, and/or other motion phase of interest. The reference motion phase of interest can also be identified by a user via the input device(s) 132. Generally, the reference motion phase of interest is a motion phase with relatively less motion than other motion phases. However, any motion phase of interest can be utilized.

The MPOI reconstructor 204 identifies projection data corresponding to the MPOI 206 based on the motion signal. For example, where the MPOI 206 is a "quiet" or "resting" (or relatively lower motion) cardiac motion phase, the MPOI reconstructor 204 can identify the projection data based on an "R" peak of a "QRS" complex in an ECG based motion signal, an "R-R" interval between two "R" peaks of neighboring "QRS" complexes, etc. For example, the projection data can be identified based on a predetermined time (e.g., 0.7 seconds, assuming a heart rate of approximately one beat per second) after an "R" peak, a percentage (e.g., 70%, assuming a heart rate of approximately one beat per second) of an "R-R" interval, etc. Other approaches are contemplated herein.

The scan data processor 128 further includes a rendering engine 208. The rendering engine 208, in the illustrated embodiment, visually displays in human readable format the reconstructed image data at the motion phase of interest via a display of the output device(s) 130 and/or other display. The reconstructed image data at the motion phase of interest can be displayed using 2D and/or 3D rendering algorithms such as axial, sagittal, coronal, oblique, curved, straightened, maximum intensity projection (MIP), direct volume rendering (DVR), and/or other 2D and/or 3D rendering algorithms.

The scan data processor 128 further includes a tissue of interest (TOI) identifier 210. The TOI identifier 210 allows a user to identify tissue of interest (TOI) from the displayed reconstructed image data through the input device(s) 132 and/or otherwise. For this, the TOI identifier 210 receives a signal indicative of tissue of interest identified by the user. The TOI can be manually identified by the user (e.g., through free hand drawings, etc.) and/or automated software tools. In the latter case, the user can accept, modify and/or reject any automatically selected TOI. The user, via the input device(s) 132, can pan, zoom, rotate, window/level, and/or other manipulate the rendered image data to segment the TOI.

The rendering engine 208 displays the TOI superimposed over the displayed reconstructed image data. Likewise, this data can be displayed using a 2D and/or a 3D rendering algorithm of interest.

The scan data processor 128 further includes a volume of interest (VOI) segmentor 212. The VOI segmentor 212 allows a user to define a volume of interest around the TOI and segment the TOI through the input device(s) 132 and/or otherwise. For this, the VOI segmentor 212 receives a signal indicative of the volume to segment selected by the user. The VOI can be manually identified by the user (e.g., through free hand drawings, etc.) and/or automated segmentation software tools. In the latter case, the user can accept, modify and/or reject the segmentation. The user, via the input device(s) 132, can pan, zoom, rotate, window/level, and/or other manipulate the rendered image data before, during and/or after the segmentation.

The rendering engine 208 displays the segmented VOI superimposed over the displayed reconstructed image data, along with the identified TOI. Likewise, this data can be displayed using a 2D and/or a 3D rendering algorithm of interest and TOI.

The scan data processor 128 further includes a neighboring motion phase(s) NMP reconstructor 214. The NMP reconstructor 214 reconstructs projection data corresponding to other motion phases. In this example, the image data processor 128 includes as a neighboring motion phase (NMP) 216, which identifies the neighboring motion phase(s) reconstructed by the NMP reconstructor 214. The NMP 214 can be a default, user preference, protocol based, and/or other neighboring motion phase(s). The neighboring motion phase(s) can be identified by a user via the input device(s) 132. In one instance, the neighboring motion phase(s) include at least one phase on each side of the MPOI 206. However, any other motion phase can be utilized.

The scan data processor 128 further includes a registerer/motion vector field (MVF) estimator 218. The registerer/MVF estimator 218 registers the segmented VOI and the reconstructions at the other motion phases. The registerer/MVF estimator 218 can employ an elastic and/or rigid registration algorithm. The registration includes estimating MVFs between the segmented VOI and the other reconstructions and transferring the segmented VOI to the other reconstructions based on the MVFs.

The rendering engine 208 displays at least one of the reconstructions at the other motion phases with the registered segmented VOI superimposed there over.

The scan data processor 128 further includes a motion vector field (MVF) updater 220. The MVF updater 220 allows a user to adjust one or more of the registered segmented VOIs in one or more of the rendered other reconstructions. For this, the MVF updater 220 receives a signal indicative of a change in location (e.g., a translation, etc.), orientation (e.g., a rotation, etc.), path, etc. By way of example, the user can click on a TOI via a computer mouse and drag, rotate, etc. the TOI to a new location. In one instance, adjusting a single TOI in one neighboring reconstruction adjusts one or more segmented VOIs or TOIs in one or more other neighboring reconstructions. In yet another instance, adjusting a single TOI in one neighboring reconstruction only adjusts that single segmented TOI. Once finished, the MVF updater 220 generates a set of updated MVFs, which are more specific to the subject. Automated and/or semi-automated approaches are also contemplated herein.

The scan data processor 128 further includes a motion compensated reconstructor 222. The motion compensated reconstructor 222 reconstructs the projection data employing a motion compensated reconstruction algorithm that utilizes the updated MVFs. Examples of suitable motion compensated reconstruction algorithms include, but are not limited to, the algorithms described in US 20080267455 A1 to Grass et al., entitled "Method for Movement Compensation of Image Data," and filed Dec. 11, 2006, the entirety of which is incorporated herein by reference, and U.S. Pat. No. 7,630,528 B2 to Kohler et al., entitled "Motion Compensation," and filed Feb. 25, 2005, the entirety of which is incorporated herein by reference.

In general, the MVF updater 220 allows the user to refine the accuracy of MVFs generated by the registerer/MVF estimator 218 and/or otherwise. As discussed herein, this may allow for improving image quality in instances in which less accurate MVFs generated by the registerer/MVF estimator 218 would otherwise reduce image quality, relative to the original reconstruction.

In FIG. 2, the MPOI reconstructor 206, the NMP reconstructor 214, and the motion compensated reconstructor 222 are shown as three separate reconstructors. In a variation, two or more of the MPOI reconstructor 206, the NMP reconstructor 214, and the motion compensated reconstructor 222 can be implemented with the same reconstructor. Furthermore, one or more of the MPOI reconstructor 206, the NMP reconstructor 214, and the motion compensated reconstructor 222 can be implemented via the reconstructor 214 (FIG. 1).

Figure 3:
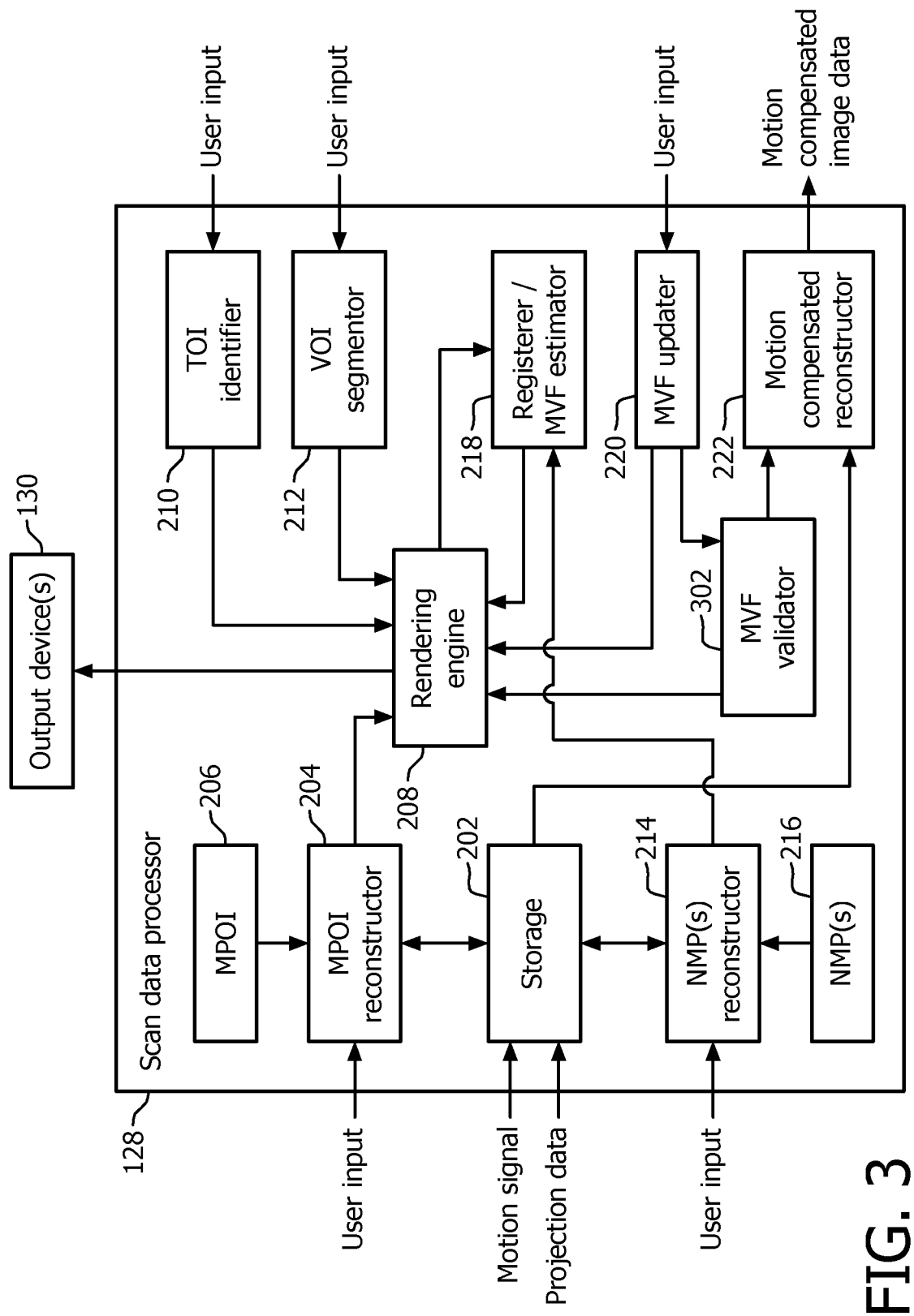

FIG. 3 shows a variation in which the scan data processor 122 further includes a motion vector field (MVF) validator 302.

In this variation, the MVF validator 302 determines whether a set of updated MVFs would result in distorting structure in a reconstruction of a neighboring motion phase more than a threshold amount. For this, the MVF validator 302 can employ a similarity or other measure to determine the similarly between the reconstruction at the MPOI and a neighboring reconstruction at a NMP after applying an updated MVF there between. The similarity measured can then be compared with a predetermined threshold.

The MVF validator 302 can display a message, notification, warning, etc. via the rendering engine 218 and the output device(s) 130 indicating whether the similarity measure satisfies the predetermined threshold. The user can then decide whether to proceed and utilize the updated MVFs, create another set of updated MVFs, still utilize the updated MVFs, etc. This can be achieved through the input device(s) 132 and/or otherwise. The MVF validator 302 may also recommend an adaption and/or manipulation that would satisfy the threshold.

The scan data processor 128 can be process projection data in connection with various applications such a cardiac, respiratory, and/or other applications in which moving structure is scanned. For instance, in one non-limiting cardiac application, the TOI includes one or more centerlines of one or more coronary arteries. In a non-limiting respiratory application, the TOI includes one or more nodules in the lungs.

Figure 4:
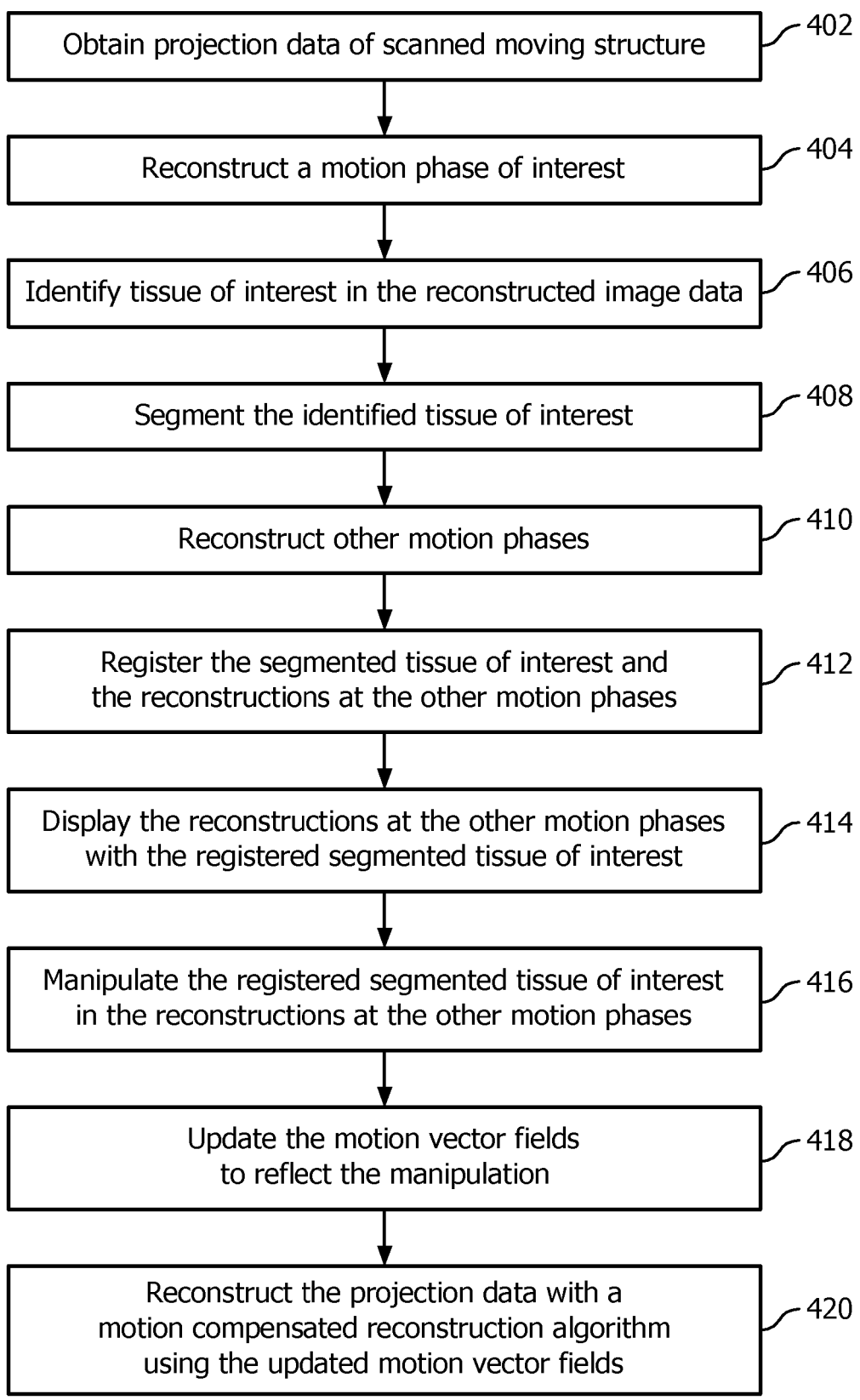
FIG. 4 illustrates an example motion compensated reconstruction method.

FIG. 4 illustrates an example method in accordance with embodiments discloses herein.

It is to be appreciated that the ordering of the acts in the methods is not limiting. As such, other orderings are contemplated herein. In addition, one or more acts may be omitted and/or one or more additional acts may be included.

At 402, projection data from a scan of a moving subject is obtained.

At 404, a first sub-set of the projection data corresponding to a particular motion phase is reconstructed, generating first image data for the particular motion phase.

At 406, tissue of interest is identified in the first image data.

At 408, a volume of interest around the tissue of interest is segmented.

At 410, a second sub-set of the projection data corresponding to the same structure but one or more other motion phases is reconstructed, generating other image data for one or more other motion phases.

At 412, the segmented volume of interest is registered with the image data for one or more other motion phases, generating motion vector fields between the volume of interest and the other image data for one or more other motion phases.

At 414, the other image data for at least one of the one or more other motion phases is visually displayed with the segmented volume of interest superimposed there over.

At 416, the superimposed segmented volume of interest is manipulated (e.g., translated, rotated, scaled, etc.) to further align the segmented volume of interest with the representation of the tissue of interest in the visually displayed other image data for at least one of the one or more other motion phases.

At 418, the motion vector fields between the volume of interest and the other image data for the at least one of the one or more other motion phases are updated to reflect the manipulation.

At 420, the projection data is reconstructed with a motion compensated reconstruction algorithm that uses the updated the motion vector fields.

As discussed herein, prior to act 420, the validity of the updated motion vector fields can be determined. For example, this can be achieved by determining a similarity measure between the first image data and the other image data with the updated motion vector fields applied.

FIGS. 5, 6, 7, 8, 9 and 10 show an example with respect to a cardiac scan.

Figure 5:
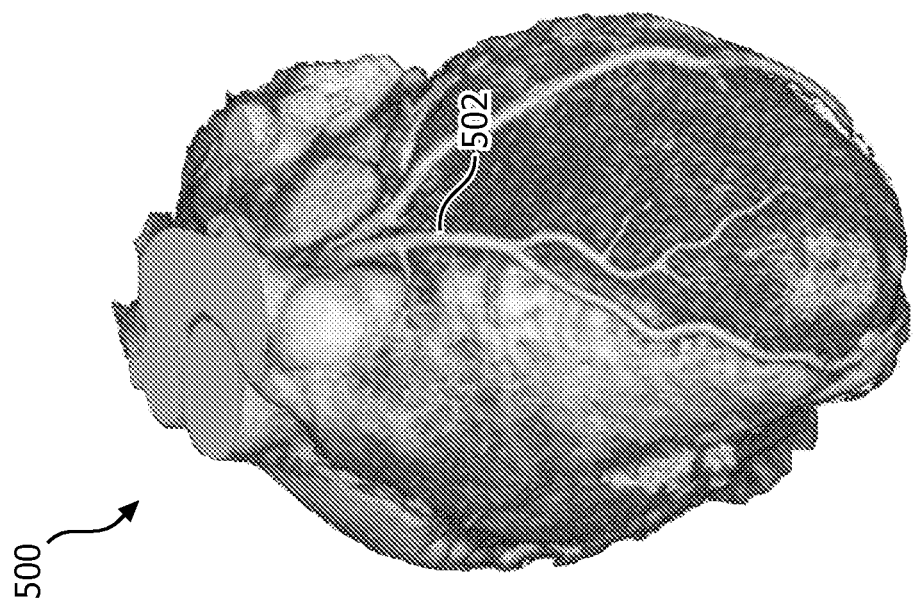
FIG. 5 illustrates an example volume rendering of the heart at a reference motion phase of interest.

FIG. 5 shows a first rendering 500 of the heart, including at least one coronary artery 502, for a target or reference cardiac motion phase.

Figure 6:
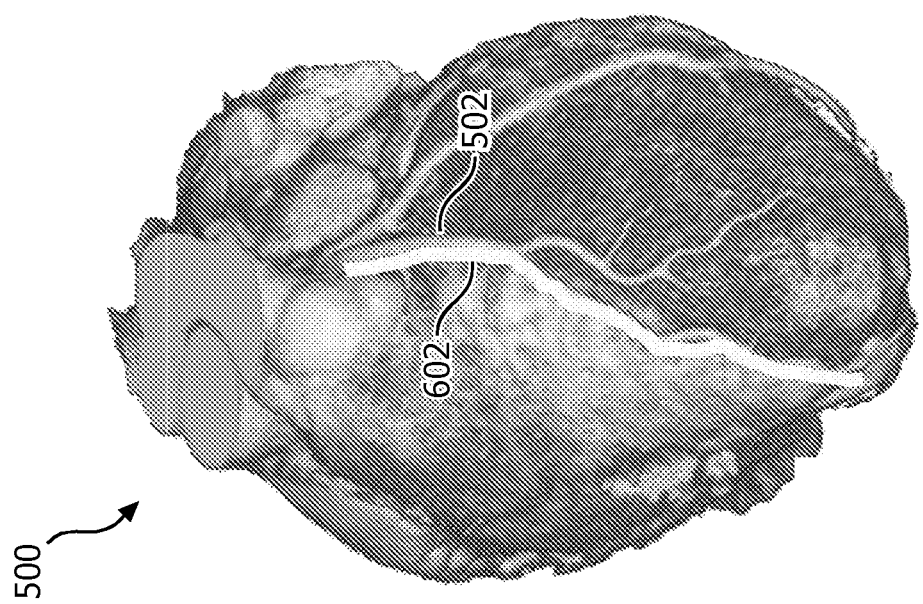
FIG. 6 illustrates an example of the volume rendering of FIG. 5 with the centerline of a vessel segmented.

In FIG. 6, a centerline 602 of the at least one coronary artery 502 is identified and segmented.

Figure 7:
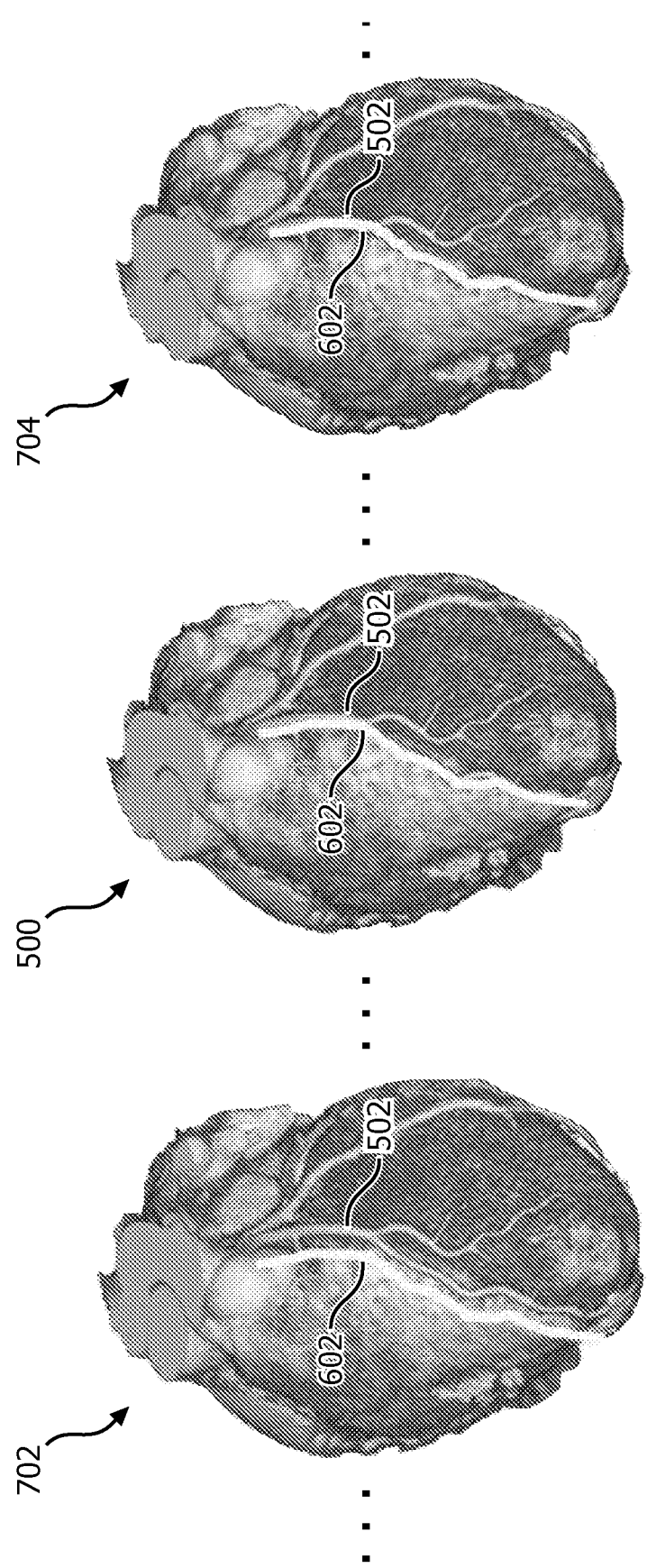
FIG. 7 illustrates example volume renderings of the heart, including the volume rendering of FIG. 5 with the centerline of the vessel segmented and volume renderings at other motion phases with the segmented centerline registered thereto and superimposed thereover.

FIG. 7 shows the first rendering 500 with the segmented centerline 602 and at least one other rendering, 702 and 704, at a different motion phases, with the segmented centerline 602 registered thereto and superimposed thereover.

In this example, the segmented centerline 602 in the rendering 702 is not well aligned with the at least one coronary artery 502 as none of the centerline 602 is over the at least one coronary artery 502.

Figure 8:
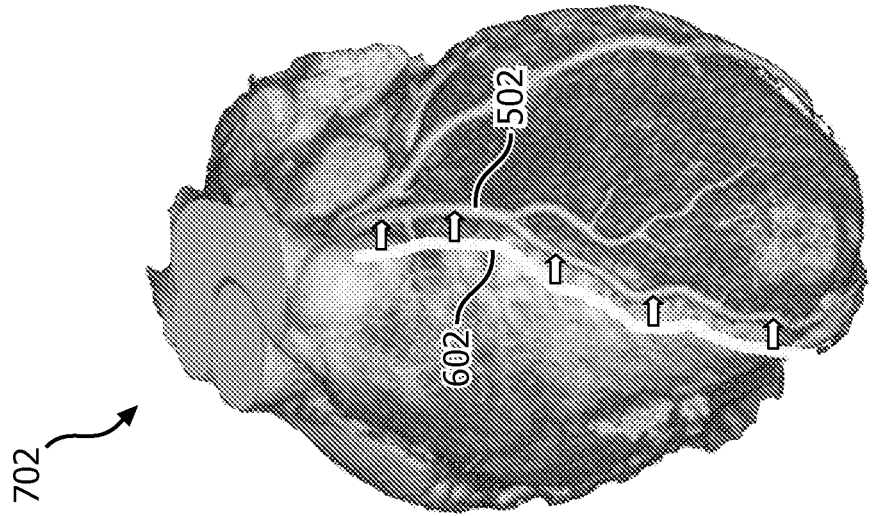
FIG. 8 illustrates an example proposed adaption of the segmented centerline in the volume rendering at another motion phase.

In FIG. 8, the segmented centerline 602 is being moved so that it is more accurately aligned with the at least one coronary artery 502.

Figure 9:
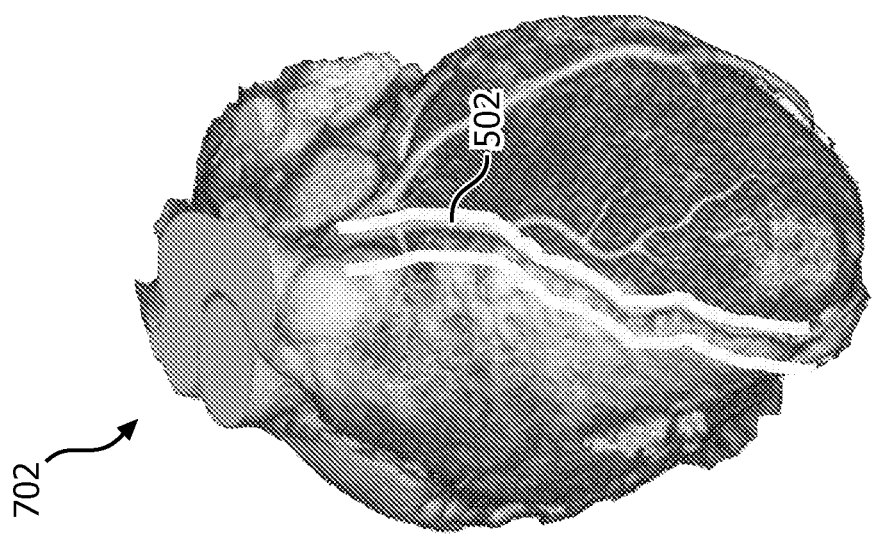
FIG. 9 illustrates pre and post adaption states for FIG. 8.

FIG. 9 shows the transition of the segmented centerline 602 move of FIG. 8.

Figure 10:
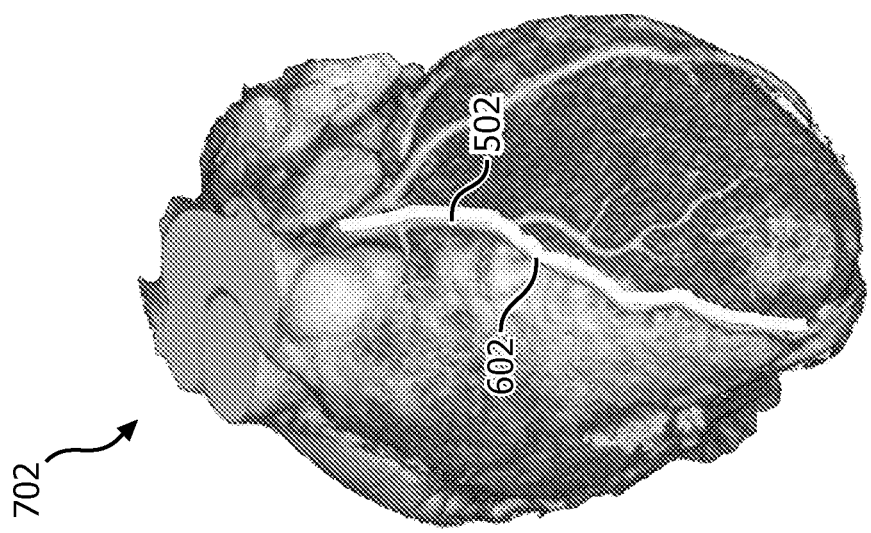
FIG. 10 illustrates the post adaption states for FIG. 8.

FIG. 10 shows the segmented centerline 602 after the move in FIG. 8, where it is more accurately aligned with the at least one coronary artery 502.

The motion vector field that places the segmented centerline 602 as shown in FIG. 7 is updated based on the manipulation of the segmented centerline 602 in FIGS. 8-10.

The projection data is now reconstructed using the updated motion vector field and a motion compensated reconstruction algorithm. The coronary artery may have improved image quality, relative to the coronary artery reconstructed with the same motion compensated reconstruction algorithm but using the motion vector field prior to the update, for example, at least since the updated motion vector field more accurately reflects the actual motion between the motion phases.

For explanatory purposes, FIGS. 5-10 are described with a change to only a single other motion phase. However, it is to be understood that the motion vector field for a plurality of different motion phases can be updated. In one instance, this includes updating multiple motion vector fields by moving the segmented centerline, as discussed in FIGS. 5-10 in connection with a single motion phase, and automatically moving the segmented centerline for one or more other motion phases based thereon. In another instance, this includes updating two more motion vector fields for two or more motion phases, each as described in FIGS. 5-8.

It is also to be appreciated that this approach can be implemented in an iterative manner in which after each reconstruction with the update motion vector fields acts 404-416 are repeated.

In another example, the tissue of interest is a lung nodule(s). For this example, a first rendering includes a lung nodule of interest for a target respiratory motion phase. The nodule can be identified, and a perimeter of the lung nodule can be determined and segmented. The segmented lung nodule is registered with reconstructions corresponding to one or more other respiratory motion phases. At least one other rendering at a different respiratory motion phase is visually displayed with the registered segmented lung nodule superimposed there over.

The superimposed segmented lung nodule superimposed is manipulated to more accurately reflect its true location in the lungs. The motion vector field between the two motion phases is updated based on the manipulation. The projection data is then reconstructed using the updated motion vector field and a motion compensated reconstruction algorithm. Again, the resulting image data may have improved image quality, relative to image data reconstructed with the same motion compensated reconstruction algorithm but using the motion vector field prior to the update.

The above two examples, coronary artery and lung nodule are just two non-limiting examples. In general, the above can be applied in connection with any scan of moving structure to compensate for motion between different motion phases.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
    manipulating segmented structure of interest, which is segmented from first reconstructed image data at a reference motion phase of interest, that is registered to second reconstructed image data at one or more other motion phases;
    updating initial motion vector fields corresponding to the registration of the segmented structure of interest to the second reconstructed image data based on the manipulation; and
    reconstructing projection data with a motion compensated reconstruction non-iterative algorithm employing the updated motion vector fields.

2. The method of claim 1, further comprising:
    registering the segmented structure of interest with the second reconstructed image data at the one or more other motion phases, thereby generating the initial motion vector fields, which include motion vector fields between the segmented structure of interest and the second reconstructed image data.

3. The method of claim 1, comprising:
    visually displaying the second reconstructed image data with the registered segmented structure of interest superimposed there over; and
    manipulating the segmented structure of interest superimposed over the displayed the second reconstructed image data.

4. The method of claim 3, wherein the manipulating of the segmented structure of interest superimposed over the displayed second reconstructed image data, comprises:
    at least one of translating, rotating or scaling the segmented structure of interest.

5. The method of claim 1, further comprising:
    receiving a signal indicative of a user manipulation of interest; and
    manipulating the registered segmented structure of interest based on the signal.

6. The method of claim 1, further comprising:
    obtaining projection data from a scan of moving structure;
    identifying a first sub-set of the projection data corresponding to the reference motion phase of interest; and
    reconstructing the sub-set of the projection data, thereby generating the first image data.

7. The method of claim 6, further comprising:
    identifying a second sub-set of the projection data corresponding to the one or more other motion phases; and
    reconstructing the second sub-set of the projection data, generating the second reconstructed image data at one or more other motion phases.

8. The method of claim 1, further comprising:
    validating the updated motion vector fields prior to employing the updated motion vector fields to reconstruct.

9. The method of claim 8, the validating, comprising:
    computing a similarity measure between first reconstructed image data at the motion phase of interest and second reconstructed image data at the one or more other motion phases after the manipulation;
    comparing the similarity measure to a predetermined threshold; and
    validating the updated motion vector in response to the similarity measure satisfying the predetermined threshold.

10. The method of claim 9, further comprising:
    generating and presenting a notification in response to the similarity measure not satisfying the predetermined threshold.

11. The method of claim 1, wherein the structure of interest is a coronary artery centerline and the segmented structure of interest includes a region around the coronary artery and the centerline.

12. The method of claim 1, wherein the structure of interest is a lung nodule.

13. A scan data processor, comprising:
    a motion phase of interest reconstructor that reconstructs a sub-set of projection data corresponding to a motion phase of interest, generating first image data;
    a tissue of interest identifier that identifies tissue of interest in the first image data;
    a volume of interest segmentor that segments the identified tissue of interest in the first image data;
    a registerer/motion vector field estimator that registers the segmented tissue of interest with second image data reconstructed at one or more other motion phases, thereby generating motion vector fields between the segmented tissue of interest and the second image data reconstructed at the one or more other motion phases;
    a motion vector field motion vector field updater that manipulates the registered segmented tissue of interest in connection with the second image data and updates the motion vector fields based on the manipulation; and
    a motion compensated reconstructor that reconstructs the projection data only once with a motion compensated reconstruction algorithm that uses the updated motion vector fields to generate third image data.

14. The scan data processor of claim 13, further comprising:
    a rendering engine and a display, wherein the rendering engine visually displays the reconstructed other image data with the registered segmented tissue of interest superimposed there over, and the motion vector field updater manipulates the visually displayed superimposed registered segmented tissue of interest.

15. The scan data processor of claim 14, wherein the motion vector field updater manipulates the visually displayed superimposed registered segmented tissue of interest by at least one of translating, rotating or scaling the segmented tissue of interest.

16. The scan data processor of claim 14, wherein the motion vector field updater manipulates the visually displayed superimposed registered segmented tissue of interest based on a signal indicative of a user manipulation of interest.

17. The scan data processor of claim 13, further comprising:
a motion vector field validator that validates the updated motion vector fields.

18. The scan data processor of claim 17, wherein the motion vector field validator validates the updated motion vector fields by computing a similarity measure between first reconstructed image data at the motion phase of interest and second reconstructed image data at the one or more other motion phases after the manipulation, comparing the similarity measure to a predetermined threshold, and validating the updated motion vector in response to the similarity measure satisfying the predetermined threshold.

19. The scan data processor of claim 13, wherein the structure of interest is one of a coronary artery or a lung nodule.

20. A non-transitory computer readable storage medium encoded with one or more computer executable instructions, which, when executed by a processor of a computing system, causes the processor to:
adapt a segmented vessel centerline registered to a coronary artery in image data to more accurately align with the coronary artery; and
refine a motion vector field corresponding to the registration between the segmented vessel centerline to the image data based on the adaption; and
reconstruct the image data with a motion compensated reconstruction non-iterative algorithm employing the refined motion vector field.

* * * * *